United States Patent [19]

Lux et al.

[11] Patent Number: 4,871,907
[45] Date of Patent: Oct. 3, 1989

[54] FIBER OPTIC LINEAR POSITION TRANSDUCER

[75] Inventors: Paul A. Lux, Poway; Ronald F. Mathis, Ramona, both of Calif.

[73] Assignee: General Dynamics, Electronics Division, San Diego, Calif.

[21] Appl. No.: 150,926

[22] Filed: Feb. 1, 1988

[51] Int. Cl.⁴ ............................ H01J 5/16; H01J 40/14
[52] U.S. Cl. .............................. 250/227; 250/237 G
[58] Field of Search ........... 250/227, 560, 561, 237 G; 356/1, 4, 5, 141, 152; 354/403

[56] References Cited

U.S. PATENT DOCUMENTS

4,560,271 12/1985 Fumio ..................................... 356/5
4,761,546 8/1988 Ikari et al. .............................. 356/1

Primary Examiner—David C. Nelms
Assistant Examiner—William L. Oen
Attorney, Agent, or Firm—Brown, Martin, Haller & McClain

[57] ABSTRACT

A system and method for detecting the positioning of an object wherein a driver generates an optical signal and intensity modulates the optical signal at a rate corresponding to the sum of N different frequencies. A transducer, responsive to relative physical positioning of the object, receives the intensity modulated optical signal and extracts a portion of the intensity modulated optical signal corresponding in intensity to selected ones of the N frequencies. A decoder, responsive to the extracted portion of the intensity modulated optical signal, generates a position signal according to the selected ones of the N frequencies in the extracted portion. The position signal is indicative of the relative positioning of the object with respect to the transducer.

31 Claims, 4 Drawing Sheets

FIBER OPTIC LINEAR POSITION TRANSDUCER

BACKGROUND OF THE INVENTION

The present invention relates to position transducers and position sensors. More specifically, the present invention relates to a novel and improved fiber optic linear position transducer that uses intensity modulated light for sensing object position with respect to the transducer and for communications between the transducer and encoder/decoder equipment.

II. Background Art

It is well known to use various types of electrical position transducers such as stress gauges, to detect the relative physical positioning of an object with respect to the transducer. However, in certain applications, the use of a position transducer using electrical signals is ill advised. In certain environments, electrical interference about the transducer or the transducer communication lines may result in erroneous position data or no measurement data at all. An example of this type of environment would include aircraft and helicopters which are made of electrically non-conducting materials.

There exist many other applications where the use of conventional electrical position transducers are unadvisable. For example, in plants that handle inflammable liquids or gases the use of such devices in these environments can be quite hazardous. With the electrical position transducer, the transducer and its communications lines may be susceptible to electrical sparking which in turn could result in the ignition of the liquids or gases.

It is therefore an object of the present invention to provide a novel and improved fiber optic linear position transducer and transducer system using optical components for position measurement.

SUMMARY OF THE INVENTION

The present invention is an optical position transducer system and method for measuring the physical positioning of an object with respect to a transducer. In one embodiment of the system, a driver generates an optical signal and intensity modulates the optical signal at a rate corresponding to a sum of N different frequencies. A coupler receives the intensity modulated optical signal at an input port and transmits it to a tranceiver port. An optical waveguide couples the intensity modulated optical signal from the tranceiver port to a remotely located transducer. The transducer receives the intensity modulated optical signal from the coupler via the optical waveguide and in response to the relative physical positioning of the object with respect to the transducer extracts a portion of the intensity modulated optical signal. The extracted portion varies in intensity corresponding to selected ones of the N frequencies. The transducer provides the extracted portion as a return optical signal to the coupler via the optical waveguide. The coupler provides the return optical signal to a decoder. The decoder upon receiving the return optical signal generates a binary coded position signal according to the selected ones of the N frequencies present in the variation in intensity of the return optical signal. The position signal is thus indicative of the position of the object with respect to the transducer.

In an alternate embodiment, the optical position transducer system uses the driver for generating an optical signal and intensity modulating the optical signal at a rate corresponding to the sum of N different frequencies. A first optical waveguide couples the intensity modulated optical signal to a transducer. The transducer upon receiving the intensity modulated optical signal and in response to the relative physical positioning of an object with respect to the transducer extracts a portion of the intensity modulated optical signal. The extracted portion is provided as a return optical signal from the transducer to the second optical waveguide. The return optical signal varies in intensity corresponding to selected ones of the N frequencies as determined by the object positioning. A second optical waveguide couples the return optical signal to a decoder. The decoder generates a binary coded position signal according to the selected ones of the N frequencies present in the variation in intensity of the return optical signal. The position signal is thus indicative of the position of the object with respect to the transducer.

BRIEF DESCRIPTION OF THE DRAWINGS

The objects, advantages and features of the present invention will be more fully apparent from the detailed description set forth below taken in conjunction with the accompanying drawings in which like reference characters correspond throughout and wherein.

DETAILED DESCRIPTION OF THE PREFERRED EMBODIMENTS

Figure 1:
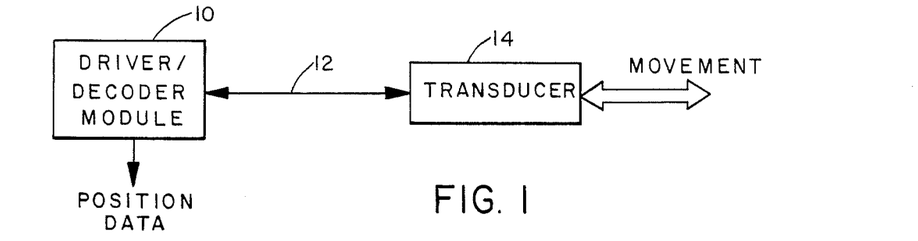
FIG. 1 is a block diagram of the overall optical linear position transducer system.

Referring now to FIG. 1, the overall system includes a driver/decoder module 10 which is coupled by an optical waveguide 12 to a transducer 14. Module 10 generates an intensity modulated optical signal that is coupled by waveguide 12 to transducer 14.

Transducer 14, typically located remotely from module 10, is responsive to the relative physical positioning of an object with respect to the transducer. Transducer 14, in response to the object positioning, generates a return optical signal that varies in intensity and is indicative of the object positioning. Transducer 14 provides the return optical signal to module 10 via waveguide 12.

Module 10 receives and decodes the intensity variation in the return optical signal so as to generate a binary positional data signal. The positional data signal, indicative of the object positioning, is output from module 10 for further processing.

More specifically, module 10 generates an optical signal having a substantially constant optical carrier wavelength. The optical signal is intensity modulated at a rate corresponding to .pa the sum of N frequencies. The intensity modulated optical signal is output from module 10 and coupled by waveguide 12 to transducer 14.

Transducer 14 is mechanically coupled to an object in which the relative positional relationship therebetween is to be sensed. Transducer 14 filters from the received intensity modulateld optical signal selected ones of the N intensity modulation frequencies as dependent upon the position of the object with respect to the transducer. The transducer outputs the filtered signal as the return optical signal. The return optical signal is coupled to module 10 via waveguide 12.

Module 10 receives the return optical signal and identifies the intensity modulation frequencies present and/or absent from the return optical signal. Module 10 then generates a binary coded position signal based upon the presence and/or absence of the intensity modulation frequencies in the return optical signal. The binary coded position signal is thus indicative of the positioning of the object with respect to the transducer.

Transducer 14 is typically located remotely from module 10 in an environment where electrical interference would cause the transducer to give an erroneous position measurement or an environment where inflammable liquids and/or vapors thereof are present. Module 10 is typically located in a safe environment. The use of pure optical signals in the communications link between the module 10 and transducer 14, and in transducer 14, eliminates the electrical interference factor. Furthermore, the use of optical signals also eliminate the chance of an electrical spark occurring in the transducer or its communications link with module 10, which could ignite the inflammable fluids or vapors.

Figure 2A:
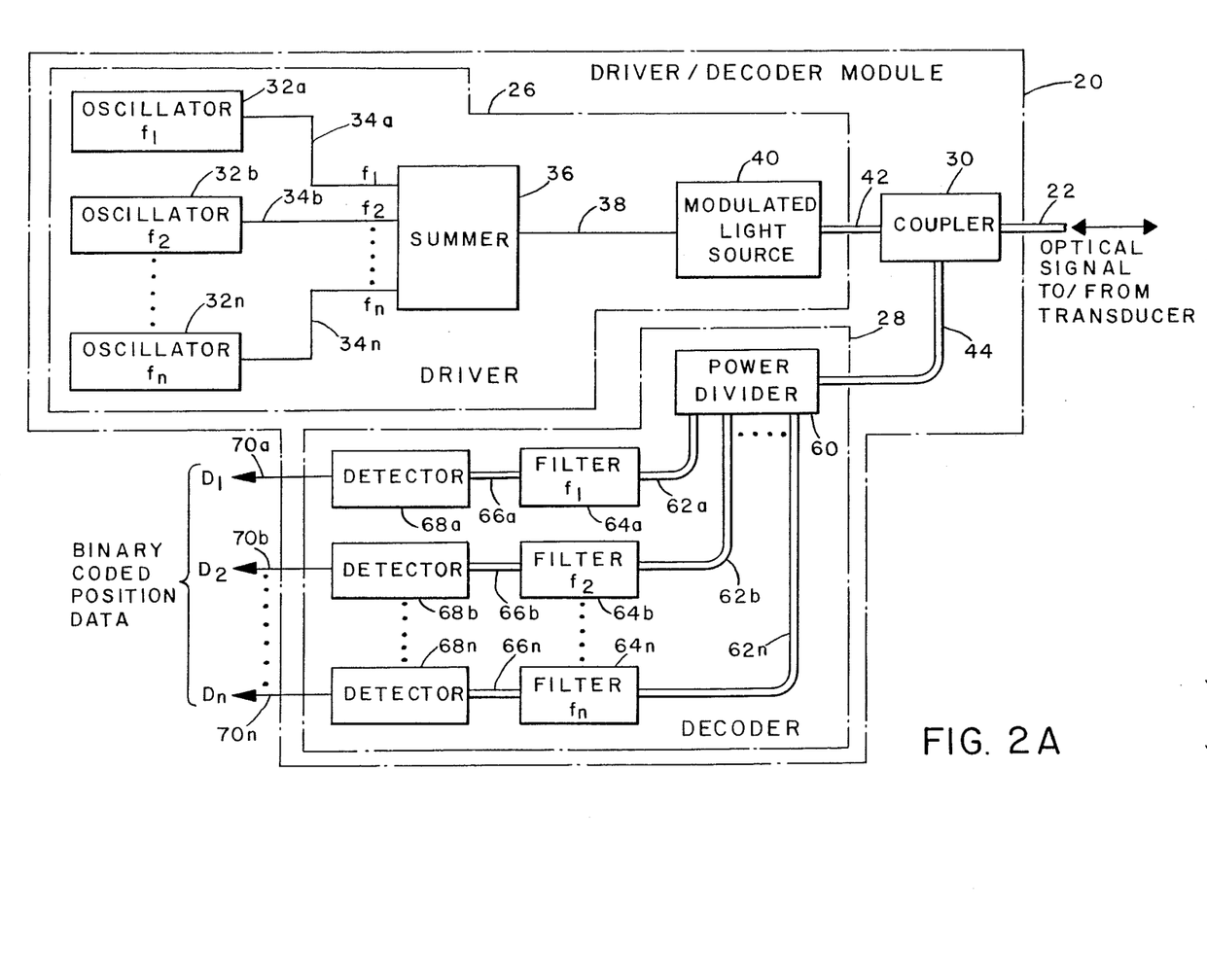
FIG. 2 is a block diagram of one embodiment of the transducer system of FIG. 1 illustrating the functional elements of the driver/decoder module and transducer.
Figure 2B:
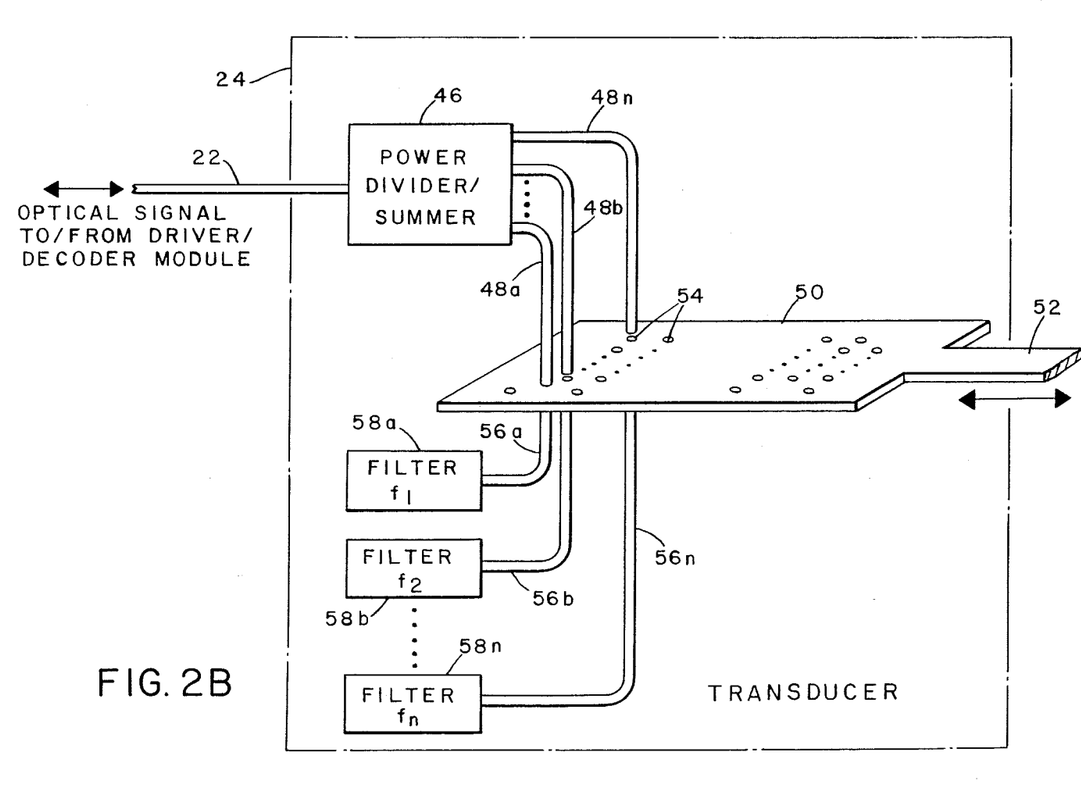

FIG. 2 illustrates one embodiment of the system of the present invention. In FIGS. 2A and 2B, a driver/decoder module 20 is coupled by an optical waveguide 22 to transducer 24. Driver/decoder module 20 is comprised of a driver portion 26, a decoder portion 28 and an optical coupler 30.

Driver portion 26 is comprised of a plurality of N electrical oscillators 32a–32n each of which generate an electrical signal at a predetermined different constant frequency. For example, oscillators 32a, 32b and 32n respectively generate signals at frequencies $f_1$, $f_2$ and $f_n$. The output from each oscillator 32a–32n is coupled by respective lines 34a–34n to signal summer 36. Summer 36 sums the signals into a single composite signal. Summer 36 may be constructed as an operational amplifier summing circuit or any one of the many types of signal summing circuits that are well known in the art. Summer 36 generates a composite signal that has a frequency content corresponding to the summation of the N frequencies.

The output from summer 36 is coupled by line 38 to the modulation input of modulated light source 40. Modulated light source 40 may be comprised of a laser diode. In the of the laser output. Modulated light source 40, in response to the composite signal, generates a corresponding intensity modulated optical signal. The optical signal is typically a constant carrier wavelength optical signal varying in intensity according to the sum of the N frequency components in the composite signal. In essence, the intensity of the optical signal is varying at rate corresponding to the sum of the N frequencies at which oscillators 32a–32n are set.

The optical signal is coupled from modulated light source 40 via an optical waveguide 42, such as in a single mode optical fiber or a monolithic waveguide, to the input of coupler 30. Coupler 30 is typically a directional coupler or fused biconical taper coupler. Coupler 30 has, in addition to the input port, a transceiver port that is coupled to optical waveguide 22. Coupler 30 also has an output port that is coupled via optical waveguide 44 to decoder portion 28. Optical waveguide 44 is typically a single mode optical fiber or monolithic waveguide.

The intensity modulated optical signal output from modulated light source 40 is directed through coupler 30 to waveguide 22 where it is conducted to transducer 24. In transducer 24, the other end of waveguide 22 is coupled to optical divider/summer 46. The intensity modulated optical signal is received by optical divider/summer 46 which divides the optical signal into N equal optical signals each provided to a different one of N distribution/collection ports.

Optical waveguides 48a–48n are each coupled at one end to a respective one of the N distribution/collection ports. The other ends of waveguides 48a–48n are aligned to face to one side of scale 50. Optical waveguides 48a–48n are arranged in a predetermined order, for example, side by side forming a single row.

Scale 50 has formed therein a mask having predetermined positions of optical transmissivity. Scale 50 is adapted for coupling at end 52 to an object (not shown) whose position is to be measured with respect to the transducer. Scale 50 is slidably mounted within the housing of transducer 24. Scale 50 therefore linearly change position within transducer 24 in relation to the movement of the object with respect to transducer 24. Waveguides 48a–48n are arranged in a pattern as mentioned previously and as illustrated in FIG. 2B, are arranged side by side across the width of scale 50.

The mask formed in scale 50 is comprised of rows of optically transmissive portions. In one case rows of holes 54 are formed across the width of scale 50. Holes 54 extend through the thickness of scale 50 from one side to the other. Holes 54 permit the transmission of an optical signal coupled on waveguide 48a–48n through scale 50.

Positioned on the other side of scale 50 are optical waveguides 56a–56n each having an end facing the other side of scale 50. The other ends of waveguides 48a–48n are each in optical alignment with an end of a respective one of waveguides 56a–56n. Each row of holes 54 and hole positions not having holes therein, define a unique code. Optical signals are coupled through holes 54 in the row across scale 50 in which waveguides 48 and 56 are in alignment therewith. The other ends of waveguides 56a–56n are each respectively coupled to a different one of optical filters 58a–58n. Waveguides 56a–56n therefore couple the intensity modulated optical signal received from a corresponding one of waveguides 48a–48n through a hole 54, if present in the row, to a corresponding one of filters 58a–58n.

Each filter 58a–58n is a multi-mode optical fiber that functions as a resonant cavity tuned to a different frequency. As such, each filter operates as an optical bandpass filter that filters the intensity modulation on the optical signal at a different one of the N intensity modulation frequencies of oscillators 32a–32n. Such filters are disclosed in U.S. Pat. No. 4,577,924, issued Mar. 25, 1986 and entitled "Optical Recursive Filter," the disclosure of which is incorporated by reference herein. Each filter 58a–58n uses a single input/output port for receiving the input signal and providing an output signal on its respective waveguide 56a–56n. Each filter 58a–58n that receives the intensity modulated optical signal eliminates all intensity modulation frequencies from the intensity modulation on the optical signal except for the one frequency each respective filter is tuned to pass. Each filter then returns its filtered or single frequency intensity modulated optical signal via a respective waveguide 56, hole 54, and waveguide 48 to divider/summer 46.

Divider/summer 46 combines or sums each of the filtered optical signals into a composite return optical signal. The return optical signal is an intensity modulated optical signal in which the intensity varies at a rate corresponding to the sum of the ones of the N individual intensity modulation frequencies present in the filtered optical signals. The return optical signal is coupled via waveguide 22 to coupler 30 of driver/decoder module 20. Coupler 30 has an output port coupled to one end of waveguide 44 with the other end of waveguide 44 coupled to decoder portion 28. The other end of waveguide 44 is coupled in decoder portion 28 to the input port of divider 60. The return optical signal is therefore coupled from the output port of coupler 30 via waveguide 44 to divider 60.

Divider 60 provides the return optical signal to each of N output ports. Each output port of divider 60 is coupled by an optical waveguide 62 to a corresponding optical filter 64a-64n. Each optical filter 64a-64n is an optical bandpass filter that corresponds to a respective one of filters 58a-58n. Filters 64a-64n are each respectively tuned to pass intensity modulation at a frequency corresponding to the intensity modulation frequencies of oscillators 32a-32n. Each filter respectively eliminates all intensity modulation frequencies from the return optical signal received from a corresponding waveguide 62 except for intensity modulation at the frequency for which the filter is tuned.

The output of filters 64a-64n are each respectively coupled via optical waveguides 66a-66n to detectors 68a-68n. Each single frequency intensity modulated optical signal output from a respective one of filters 64a-66n is provided to a respective detectors 68a-68n. Each detector 68a-68n converts the filtered intensity modulated optical signal into a corresponding electrical signal. The electrical signals output from detectors 68a-68n are provided on lines 70a-70n as an output for further processing. The output from detectors 68a-68n form a binary coded position data signal representative of the scale positioning. The presence or absence of a signal at a given detector output determines the on or off state of the corresponding bit. The scale positioning is thus indicative of the relative physical positioning of the object with respect to the transducer. Although the system is described for converting the optical signal to a corresponding electrical signal, the optical signal itself may be used in optical processing with no electrical conversion needed.

Movement of scale 50 to different positions changes the hole pattern such that each of filters 58a-58n is correspondingly enabled or disabled from receiving the optical signal, filtering the optical signal and returning a filtered optical signal at a corresponding one of the N intensity modulation frequencies. Therefore a different frequency composition of the return optical signal results from a change in position of scale 50. The new return optical signal is filtered in filters 64a-64n to provide a different binary coded position data signal.

Figure 3:
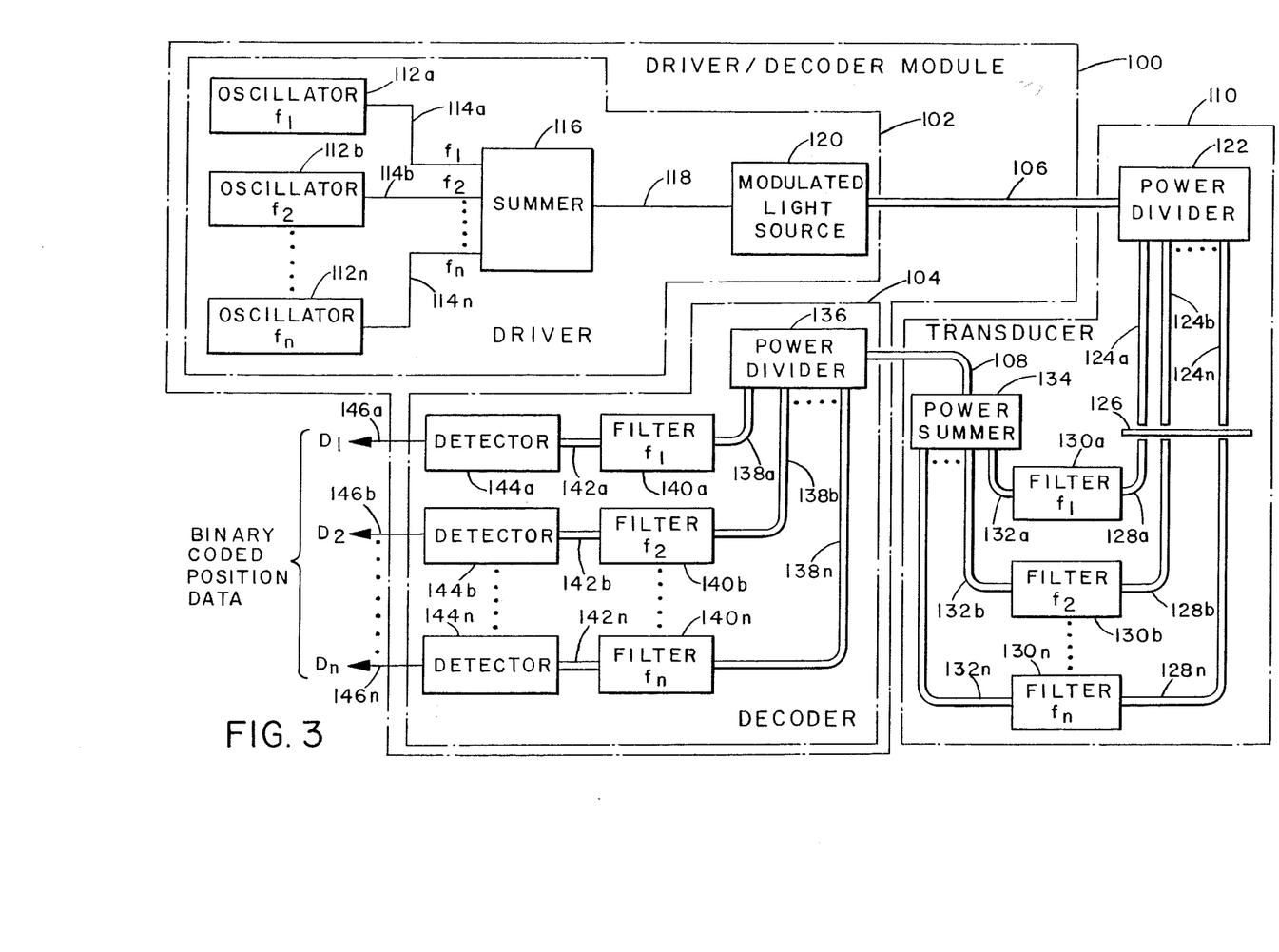
FIG. 3 is an alternate embodiment of the transducer system of FIG. 1.

FIG. 3 illustrates an alternate embodiment of the fiber optic position transducer of FIG. 1. Driver/decoder module 100 includes a driver portion 102 and a decoder portion 104. A pair of optical waveguides or fibers 106 and 108 couple the driver/decoder module 100 to transducer 110.

Driver portion 102 includes N electrical oscillators 112a-112n each for generating an electrical signal at a different predetermined frequency from one another. The output of oscillators 112a-112n are respectively provided on lines 114a-114n to summer 116. Summer 116 sums the individual oscillator output signals into a single composite electrical output signal which is output on line 118 to modulated light source 120. Modulated light source 120, in response to the electrical output signal on line 118, provides a corresponding intensity modulated optical signal on optical waveguide 106 to transducer 110.

Optical waveguide or fiber 106 is coupled to the input of divider 122 of transducer 110. Divider 122 splits the intensity modulated optical signal into N equal optical output signals with each provided at an output port. Each output port is coupled to one end of a respective one of optical waveguides or fibers 124a-124n. A scale 126 is positioned with one side facing the other ends of waveguides 124a-124n. Scale 126 contains a predetermined pattern of optical transmissivity such as was described with reference to scale 50 of FIG. 2. Positioned on the other side of scale 126 are optical waveguides or fibers 128a-128n each having an end facing the other side of scale 126 and optically aligned with another end of a respective one of optical waveguides 124a-124n facing the opposite side of scale 126.

Optical waveguides 128a-128n are each coupled at the other end to an input of a respective one of optical filters 130a-130n. Each one of filters 130a-130n are tuned to pass a different frequency of intensity modulation in an optical signal that corresponds to one of the N frequencies generated by oscillators 112a-112n. Each filtered optical signal is output from filters 130a-130n respectively on optical waveguides 132a-132n to summer 134. Summer 134 combines each filtered optical signal into a single return optical signal that is provided at its output. Coupled to the output of summer 134 is one end of optical waveguide or fiber 108. The other end of optical waveguide 108 is coupled to decoder portion 104.

It should be noted that filters 130a-130n each receive the optical signal to eliminate all intensity modulation frequencies but the respectively tuned frequency. Whether a filter 130a-130n receives an input optical signal is determined by the pattern of optical transmissivity of scale 126. Therefore, the return optical signal on optical waveguide 108 is the sum of intensity modulation of the certain ones of the N intensity modulation frequencies.

Decoder portion 104 includes a divider 136 that has an input port coupled to the other end of optical waveguide 108. Divider 136 receives the return optical signal from a summer 134 via a waveguide 108. Divider 136 splits the return optical signal into N output signals with each provided to a respective one of N output ports of divider 136. Each output port of divider 136 is coupled to an end of a respective one of optical waveguides or fibers 138a-138n Optical waveguides 138a-138n are respectively coupled at the other end to the inputs of optical filters 140a-140n.

Optical filters 140a-140n are each tuned to pass intensity modulation on an optical signal corresponding to a respective frequency of oscillators 112a-112n. Optical filters 140a-140n are generally respectively substantially identical to filters 130a-130n in filtering capabilities. Filters 130a-130n and filters 140a-140n are of the filter type described in U.S. Pat. No. 4,577,924 as discussed previously. Each of filters 140a-140n responds to the presence of a different intensity modulation frequency by providing as an output a filtered optical signal that corresponds to a respective one of the N intensity modulation frequencies. If an intensity modulation frequency is present in the return optical signal, it is coupled from the respective filter output port to a respective one of optical waveguides 142a-142n. Optical waveguides 142a-142n are each coupled at one end to a different one of filters 140a-140n. The other end of each waveguide 142a-142n is coupled to the input of a respective optical detector 144a-144n. Optical detectors 144a-144n convert the respective filtered optical signal, if provided from a corresponding filter 140a-140n, into an electrical signal. The output of detectors 140a-140n are in essence a binary coded position signal corresponding to the position of an object with respect to scale 126. As described above, detectors 144a-144n convert the optical signals into electrical signals for further processing. In other applications the optical signals as output from filters 140a-140n may be used directly in optical processing systems.

Figure 4:
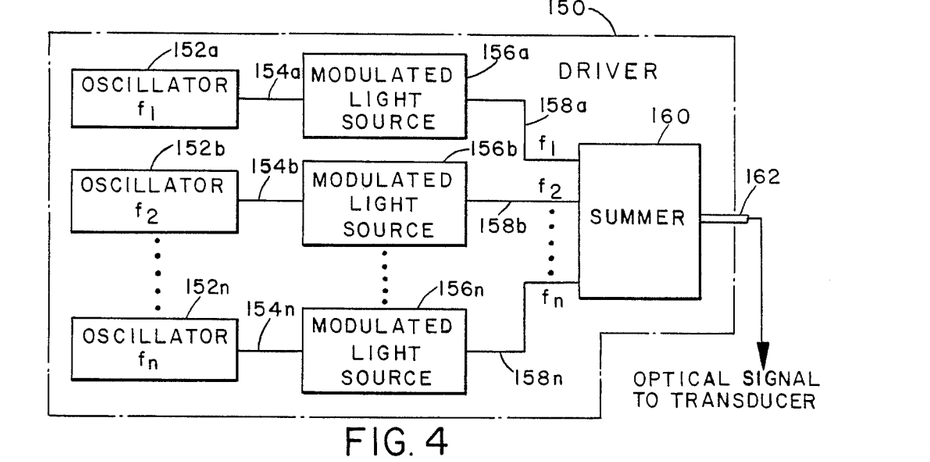
FIG. 4 is an alternate embodiment of the driver portion of the driver/decoder module of FIGS. 2 and 3.

FIG. 4 illustrates an alternate embodiment of a driver portion of either driver/decoder modules 20 or 100, respectively of FIGS. 2 and 3. In FIG. 4, driver portion 150 is comprised of a plurality of electrical oscillators 152a-152n. Each oscillator 152a-152n provides an electrical output signal each at a different frequency respectively on lines 154a-154n. Lines 154a-154n are respectively coupled to the modulation input of a respective one of modulated light sources 156a-156n.

Each modulated light source 156a-156n generates an optical signal intensity modulated according to the frequency of the respective electrical output signal provided on lines 154a-154n. Each modulated light source 156a-156n provides the respective intensity modulated optical signal respectively therefrom on lines 158a-158n to optical summer 160. Summer 160 sums each individual intensity modulated optical signal into a combined intensity modulated signal which is then provided on optical waveguide 162 to the transducer.

Figure 5:
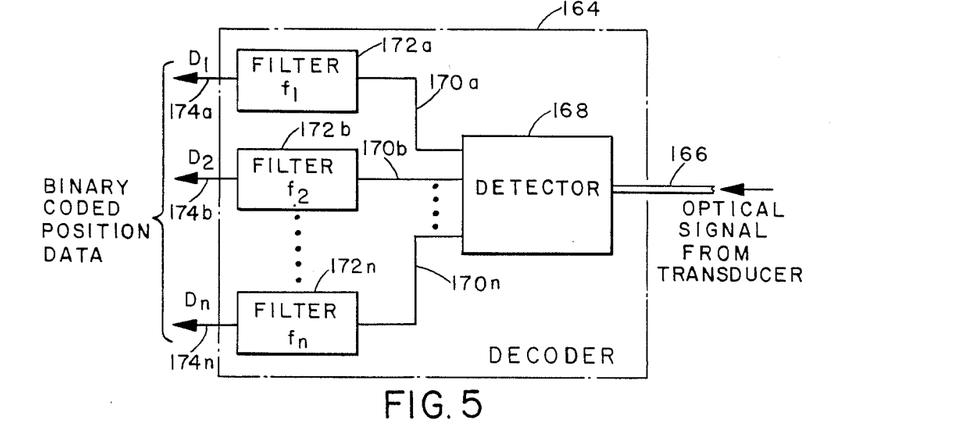
FIG. 5 is an alternate embodiment of the decoder portion of the driver/decoder module of FIGS. 2 and 3.

FIG. 5 illustrates an alternate embodiment of a divider portion for either driver/decoder modules 20 and 100 of FIGS. 2 and 3. In FIG. 5, decoder portion 164 receives the return optical signal on optical waveguide 166 from a transducer. The return optical signal, which contains certain ones of the N intensity modulation frequencies, is converted by detector 168 into an electrical signal. The electrical signal is then respectively distributed on lines 170a-170n to electrical filters 172a-172n.

Each filter 172a-172n is typically an electrical bandpass filter. Each filter 172a-172n is tuned to pass the portion of a signal at a different one of the N frequencies which corresponds to the frequencies generated by the N electrical oscillators of the driver portion. Therefore, each filter provides an output respectively on lines 174a-174n when the corresponding frequency is present in the signal distributed to the respective one of filters 172a-172n. The presence or absence of a certain frequency component in the electrical signal output from detector 168 determines whether or not the filter provides an output signal. The signals output from filters 172a-172n collectively form a binary coded position data signal indicative of the object positioning.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

What is claimed is:

1. A system for detecting the position of an object comprising:
   driver means for generating an optical signal and intensity modulating said optical signal at a rate corresponding to a sum of N different frequencies;
   transducer means adapted for coupling to an object and responsive to a relative physical positioning of said object with respect to said transducer means, said transducer means for receiving said intensity modulated optical signal and filtering from said intensity modulated optical signal intensity modulation corresponding to certain ones of said N frequencies in accordance with said relative physical positioning; and
   decoder means for receiving said filtered optical signal and responsive thereto for generating a position signal according to said certain ones of said N frequencies in said intensity modulation of said filtered optical signal, said position signal indicative of said relative physical positioning of said object with respect to said transducer means.

2. The system of claim 1 further comprising conducting means for receiving said intensity modulated optical signal from said driver means and conducting said intensity modulated optical signal to said transducer means, and for receiving said filtered optical signal from said transducer means and conducting said filtered optical signal to said decoder means.

3. The system of claim 1 wherein said driver means further comprises:
   oscillator means for generating N electrical signals each at a different one of said N frequencies; and
   converter means for generating said optical signal and responsive to said N electrical signals for intensity modulating said optical signal.

4. The system of claim 2 wherein said driver means further comprises:
   oscillator means for generating N electrical signals each at a different one of said N frequencies; and
   converter means for generating said optical signal and responsive to said N electrical signals for intensity modulating said optical signal.

5. A method for detecting the position of an object comprising the steps of:
   generating an optical signal;
   generating a composite signal formed of N different frequencies.
   intensity modulating said optical signal with said composite signal so as to form an intensity modulated optical signal;
   filtering said intensity modulated optical signal according to a position of an object with respect to a reference position, said filtered intensity modulated optical signal varying in intensity corresponding to certain ones of said N frequencies; and
   generating a position signal from said filtered optical signal according to said certain ones of said N frequencies in said intensity variations in said filtered optical signal, wherein said position signal is indicative of said object position with respect to said reference position.

6. The method of claim 5 further comprising the steps of:

transmitting said optical signal from a local location to a remote location where said object is located, said optical signal filtered at said remote location; and returning said filtered optical signal to said local location for generation of said position signal.

7. An optical position transducer system comprising:

driver means for, generating an optical signal and intensity modulating said optical signal at a rate corresponding to a sum of N different frequencies;

coupling means for, receiving said intensity modulated optical signal at an input port and transmitting said intensity modulated optical signal to a transceiver port, and for, receiving a return optical signal at said transceiver port and transmitting said return optical signal to an output port;

an optical waveguide with one end coupled to said transceiver port;

transducer means adapted for coupling to an object and coupled to an other end of said optical waveguide for, receiving said intensity modulated optical signal, sensing a relative physical positioning of said object with respect to said transducer means, filtering said intensity modulated optical signal with said filtered intensity modulated optical signal varying in intensity corresponding to certain ones of said N frequencies according to said object relative physical positioning, and providing to said optical waveguide said filtered intensity modulated optical signal as said return optical signal; and decoder means coupled to said output port for, receiving said return optical signal and generating a binary coded position signal according to said certain ones of said N frequencies in said return optical signal, said position signal indicative of said relative physical positioning of said object with respect to said transducer means.

8. The system of claim 7 wherein said driver means comprises:

oscillator means for generating N electrical signals each at a different one of said N frequencies; and converter means for generating said optical signal and responsive to said N electrical signals for intensity modulating said optical signal.

9. The system of claim 8 wherein said oscillator means comprises N electrical oscillators each having an output coupled to said converter means, each oscillator generating a respective one of said N electrical signals.

10. The system of claim 8 wherein said converter means comprises:

summing means for receiving and summing said N electrical signals so as to provide a composite electrical signal; and optical source means for generating said optical signal and responsive to said composite electrical signal for intensity modulating said optical signal.

11. The system of claim 10 wherein said optical source means comprises a laser diode having a modulation input coupled to said summing means and an output coupled to said one end of said optical waveguide.

12. The system of claim 8 wherein said converter means comprises:

source means for generating N discrete optical signals and responsive to said N electrical signals for intensity modulating each of said N discrete optical signals at a respective one of said N frequencies; and summing means for receiving each of said intensity modulated N discrete optical signals and combining said intensity modulated N discrete optical signals as said intensity modulated optical signal.

13. The system of claim 12 wherein said source means comprises N laser diodes each having a modulation input coupled to said oscillator means for receiving a corresponding one of said electrical signals and an output coupled to said summing means.

14. The system of claim 7 wherein said transducer means comprises:

distribution/collection means for receiving and distributing said intensity modulated optical signal to each of N distribution/collection ports;

N optical filters each having an input/output port optically aligned with a respective one of said distribution/collection ports, each filter for receiving said intensity modulated optical signal from a corresponding distribution/collection port and returning to said corresponding distribution/collection port a discrete portion of said intensity modulated optical signal corresponding in intensity modulation to a respective one of said N frequency components;

an optical mask movably disposed between said input/output ports and said distribution/collection ports and adapted for coupling to said object, said mask having a predetermined pattern of optical transmissivity such that selected filters receive from corresponding distribution/collection ports said intensity modulated optical signal and return thereto corresponding discrete portions of said intensity modulated optical signal as determined by the relative positioning of said object; and said distribution/collection means further for receiving said returned discrete portions of said intensity modulated optical signal and combining said returned discrete portions as said return optical signal.

15. The system of claim 7 wherein said decoder means comprises:

distribution means for receiving and providing said return optical signal to each of distribution ports; and N optical filters each coupled to a respective distribution port and each for, receiving said return optical signal, extracting from said return optical signal intensity modulation corresponding to a different one of said N frequencies, and providing corresponding output optical signal.

16. The system of claim 15 wherein said decoder means further comprises detector means responsive to each output optical signal for converting each output optical signal into a corresponding electrical signal.

17. The system of claim 7 wherein said decoder means comprises:

detector means responsive to said return optical signal for converting said return optical signal into a corresponding electrical signal;

N electrical filters each for receiving said electrical signal and extracting therefrom modulation corresponding to a different one of said N frequencies, and providing a corresponding output electrical signal.

18. An optical position transducer system comprising:

driver means for, generating an optical signal and intensity modulating said optical signal at a rate corresponding to a sum of N different frequencies;

a first optical waveguide having one end coupled to said driver means;

transducer means adapted for coupling to an object and coupled to an other end of said first optical waveguide for, receiving said intensity modulated optical signal, sensing a relative physical positioning of said object with respect to said transducer means, filtering said intensity modulated optical signal in response to said object relative positioning with said filtered intensity modulated optical signal varying in intensity corresponding to certain ones of said N frequencies according to said object relative positioning, and providing said filtered intensity modulated optical signal as a return optical signal;

a second optical waveguide having one end coupled to said transducer; and decoder means coupled to said second optical waveguide other end for, receiving said return optical signal and generating a binary coded position signal according to said certain ones of said N frequencies in said return optical signal, said position signal indicative of said relative physical positioning of said object with respect to said transducer means.

19. The system of claim 18 wherein said driver means comprises:

oscillator means for generating N electrical signals each at a different one of said N frequencies; and converter means for generating said optical signal and responsive to said N electrical signals for intensity modulating said optical signal.

20. The system of claim 19 wherein said oscillator means comprises N electrical oscillators each having an output coupled to said converter means, each oscillator generating a respective one of said N electrical signals.

21. The system of claim 20 wherein said converter means comprises:

summing means for receiving and summing said N electrical signals so as to provide a composite electrical signal; and optical source means for generating said optical signal and responsive to said composite electrical signal for intensity modulating saif optical signal.

22. The system of claim 21 wherein said optical source means comprises a laser diode having a modulation input coupled to said summing means and an output coupled to said one end of said first optical waveguide.

23. The system of claim 19 wherein said converter means comprises:

source means for generating N discrete optical signals and responsive for said N electrical signals for intersity modulating each of said N discrete optical signals at a respective one of said N frequencies; and summing means for receiving each of said intensity modulated N discrete optical signals and combining said intensity modulated N discrete optical signals as said intensity modulated optical signal.

24. The system of claim 23 wherein said source means comprises N laser° diodes each having a modulation input coupled to said oscillator means for receiving a corresponding one of said N electrical signals and an output coupled to said summing means.

25. The system of claim 18 wherein said transducer means comprises:

distribution means for, receiving and distributing said intensity modulated optical signal to teach of N distribution ports;

N optical filters each having an input and an output port, each input port optically aligned with a respective one of said distribution ports, each filter for receiving at its input port said intensity modulated optical signal from a corresponding distribution port and providing at its output port a discrete portion of said intensity modulated optical signal corresponding in intensity modulation to a respective one of said N frequency components;

an optical mask movably disposed between said input ports and said distribution ports and adapted for coupling to said object, said mask having a predetermined pattern of optical transmissivity such that selected filters receive from corresponding distribution ports said intensity modulated optical signal; and collection means having N collection ports each coupled to a different one of said filter output ports for receiving and combining said discrete portions of said intensity modulated optical signals from said N optical filters as said return optical signal.

26. The system of claim 18 wherein said decoder means comprises:

distribution means for, receiving and providing said return optical signal to each of N distribution ports; and N optical filters each coupled to a respective distribution port and each for, receiving said return optical signal, extracting from said return optical signal intensity modulation corresponding to a different one of said N modulation frequencies, and providing a corresponding output optical signal.

27. The system of claim 26 wherein said decoder means further comprises detector means responsive to each output optical signal for converting each output optical signal into a corresponding electrical signal.

28. The system of claim 18 wherein said decoder means comprises:

detector means responsive to said return optical signal for converting said return optical signal into a corresponding electrical signal;

N electrical filters each for receiving said electrical signal and extracting therefrom modulation corresponding to a different one of said N frequencies, and providing a corresponding output electrical signal.

29. A fiber optic linear position transducer for coupling to an object, for receiving an optical signal intensity modulated at the sum of N frequencies, for optically sensing the relative position of said object with respect to said transducer and for providing an output optical signal wherein the level of intensity of said output optical signal at each of said N frequencies is indicative of said object relative position, comprising:

a plurality of optical filter means each for, receiving an intensity modulated optical signal, said intensity modulated signal intensity modulated by a sum of N modulation frequencies, and each for providing a respective discrete optical signal each corresponding in intensity modulation at a different one of said N frequencies; and optical mask means for coupling to an object for movement with said object with respect to said plurality of optical filter means, and for optically transmitting said intensity modulated optical signal to certain ones of said optical filter means according to a relative position of said object with respect to said plurality of optical filter means; and wherein said plurality of optical filter means each provide a corresponding one of said respective discrete opticals corresponding to said transmission of said intensity modulated optical signal thereto by said optical mask means, the sum of said discrete optical signals corresponding to a return optical signal.

30. The transducer of claim 29 further comprising:

distribution/collection means for receiving and distributing said intensity modulated optical signal to each of N distribution/collection ports;

said plurality of optical filter means comprising N optical filters each having an input/output port optically aligned with a respective one of said distribution/collection ports, each filter for receiving said intensity modulated optical signal from a corresponding distribution/collection port and returning to said corresponding distribution/collection port said discrete optical signal corresponding in intensity modulation to a respective one of said N frequency components;

said optical mask means comprising an optical mask movably disposed between said input/output ports and said distribution/collection ports and adapted for coupling to said object, said mask having a predetermined pattern of optical transmissivity such that certain ones of said optical filters receive from corresponding distribution/collection ports said intensity modulated optical signal and return thereto said respective discrete optical signal as determined by said object relative position; and said distribution/collection means further for receiving and combining said returned discrete optical signals as said output optical signal.

31. The transducer of claim 29 further comprising:

distribution means for, receiving and distributing said intensity modulated optical signal to each of N distribution ports;

said plurality of optical filter means comprising N optical filters each having an input and an output port, each input port optically aligned with a respective one of said distribution ports, each filter for receiving at its input port said intensity modulated optical signal from a corresponding distribution port and providing at its output port said respective discrete optical signal corresponding in intensity modulation to a respective one of said N frequency components;

said optical mask means comprising an optical mask movably disposed between said input ports and said distribution ports and adapted for coupling to said object, said mask having a predetermined pattern of optical transmissivity such that certain ones of said optical filters receive from corresponding distribution ports said intensity modulated optical signal as determined by said object relative position; and collection means having N collection ports each coupled to a different one of said filter output ports for receiving and combining said discrete optical signals from said N optical filters as said return optical signal.

* * * * *

UNITED STATES PATENT AND TRADEMARK OFFICE
CERTIFICATE OF CORRECTION

PATENT NO. : 4,871,907

DATED : October 3, 1989

INVENTOR(S) : Lux et al.

It is certified that error appears in the above-identified patent and that said Letters Patent is hereby corrected as shown below:

Column 10, claim 15, line 43, after "of" insert --N--;

Signed and Sealed this

Sixth Day of November, 1990

Attest:

HARRY F. MANBECK, JR.

*Attesting Officer*     *Commissioner of Patents and Trademarks*